US008442306B2

(12) United States Patent
Garaas et al.

(10) Patent No.: US 8,442,306 B2
(45) Date of Patent: May 14, 2013

(54) VOLUME-BASED COVERAGE ANALYSIS FOR SENSOR PLACEMENT IN 3D ENVIRONMENTS

(75) Inventors: Tyler W. Garaas, Boston, MA (US); Alan Sullivan, Middleton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 395 days.

(21) Appl. No.: 12/856,475

(22) Filed: Aug. 13, 2010

(65) Prior Publication Data

US 2012/0039526 A1 Feb. 16, 2012

(51) Int. Cl.
*G06K 9/00* (2006.01)
*G06T 15/00* (2011.01)

(52) U.S. Cl.
USPC .......................................... 382/154; 345/419

(58) Field of Classification Search .................. 382/154, 382/285; 345/419–427; 356/12–14; 348/42–60, 348/143–160
See application file for complete search history.

(56) References Cited

U.S. PATENT DOCUMENTS

| | | | | |
|---|---|---|---|---|
| 5,847,711 A * | 12/1998 | Kaufman et al. | ............. | 345/424 |
| 6,057,847 A * | 5/2000 | Jenkins | ............. | 345/422 |
| 6,297,763 B1 * | 10/2001 | Thomson et al. | ............. | 342/75 |
| 6,313,841 B1 * | 11/2001 | Ogata et al. | ............. | 345/424 |
| 6,525,729 B1 * | 2/2003 | Akerman et al. | ............. | 345/426 |
| 6,685,366 B1 * | 2/2004 | Corbin | ............. | 396/427 |
| 2003/0132939 A1 * | 7/2003 | Moshe et al. | ............. | 345/474 |
| 2004/0225480 A1 * | 11/2004 | Dunham | ............. | 703/1 |
| 2005/0002662 A1 * | 1/2005 | Arpa et al. | ............. | 396/120 |
| 2005/0134499 A1 * | 6/2005 | Liu et al. | ............. | 342/75 |
| 2005/0151759 A1 * | 7/2005 | Gonzalez-Banos et al. | .. | 345/647 |
| 2008/0007720 A1 * | 1/2008 | Mittal | ............. | 356/138 |
| 2008/0133190 A1 * | 6/2008 | Peretz et al. | ............. | 703/6 |
| 2010/0239186 A1 * | 9/2010 | Fowler et al. | ............. | 382/291 |
| 2011/0035199 A1 * | 2/2011 | Kristofik et al. | ............. | 703/6 |
| 2011/0169830 A1 * | 7/2011 | D'Amora | ............. | 345/424 |
| 2011/0181592 A1 * | 7/2011 | Rhodes | ............. | 345/426 |
| 2012/0166161 A1 * | 6/2012 | Holland | ............. | 703/2 |

OTHER PUBLICATIONS

Angella et al., "Optimal Deployment of Cameras for Video Surveillance Systems", IEEE, 2007.*
Mittal et al., "Visibility Analysis and Sensor Planning in Dynamic Environments", Springer-Verlag Berlin Heidelberg, 2004.*
Murray et al. "Coverage Optimization to Support Security Monitoring", 2006.*
Ng et al., "Range-Space Approach for Generalized Multiple Baseline Stereo and Direct Virtual View Synthesis", IEEE, 2001.*
Scheuer et al., "Supporting Surveillance through Arrangement of Video Streams in a 3D Environment", Delft University of Technology, 2007.*

* cited by examiner

*Primary Examiner* — Aaron W Carter
(74) *Attorney, Agent, or Firm* — Dirk Brinkman; Gene Vinokur

(57) ABSTRACT

Coverage of sensors in a CTV system in a three-dimensional environment are analyzed by partitioning a 3D model of the environment into a set of voxels. A ray is cast from each pixel in each sensor through the 3D model to determine coverage data for each voxel. The coverage data are analyzed to determine a result indicative of an effective arrangement of the set of sensors.

20 Claims, 7 Drawing Sheets

300

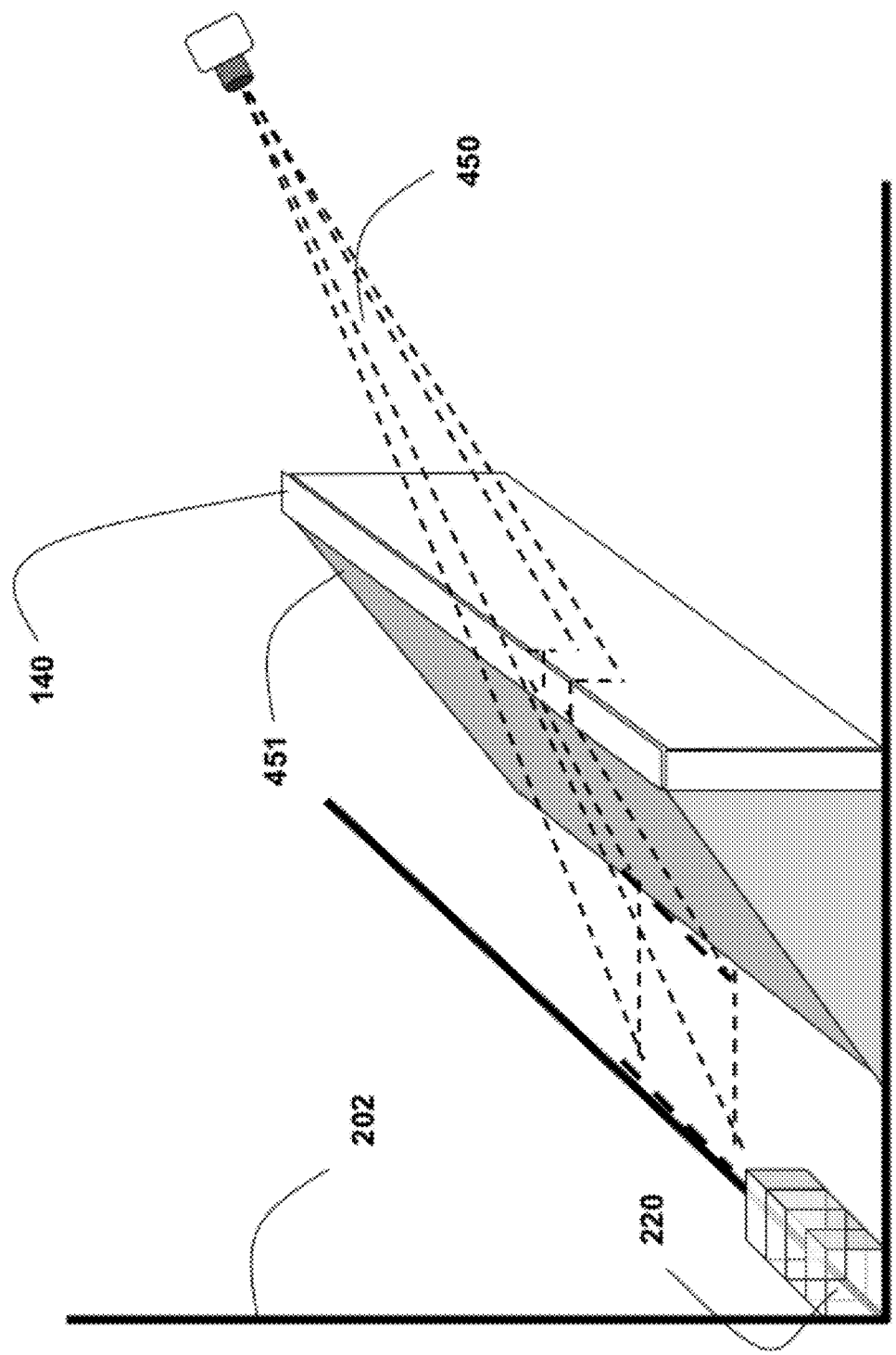

VOLUME-BASED COVERAGE ANALYSIS FOR SENSOR PLACEMENT IN 3D ENVIRONMENTS

FIELD OF THE INVENTION

This invention relates generally to surveillance systems, and more particularly to 3D coverage analysis of an environment for sensor arrangements.

BACKGROUND OF THE INVENTION

CCTV Systems

When designing an arrangement for a set of sensors, e.g., cameras in a closed-circuit television (CCTV) surveillance system, the pose of all sensors, which we refer to as the sensor arrangement, can have a dramatic impact on a cost and effectiveness of the system. As defined herein the pose is the 3D location and 3D orientation of each sensor.

This is especially true for large-scale sensor deployments that can number in the thousands of sensors. Furthermore, as mechanisms, security or otherwise, facilitated by the sensors become more sophisticated, more stringent constraints need to be taken into account to ensure system effectiveness. For example, issues such as spatial resolution and angular resolution of certain 3D locations can mean the difference between the successful deployment of a face-recognition system.

Sensor coverage describes the locations the sensor can sense, taking into account occlusions for instance, and how well the sensor can sense a given location. Measures, such as spatial resolution and angular resolution, can be used to quantify sensor coverage at a given location.

Coverage Analysis

Coverage analysis is derived from a computational geometry problem commonly referred to as the art gallery problem, where the goal is to place a minimum number of guards (human sensors), such that all locations in the gallery can be observed. The art gallery problem is considered non-deterministic polynomial-time (NP) hard.

However, theoretical computational geometry approaches do not take into account the physical, real-world nature of the applied problem of generating effective sensor arrangements. Nevertheless, most conventional approaches place sensors in an environment according to a 2D floor plan, and only use 2D data to determine sensor coverage.

FIG. 1A, for a top view, shows a result of a conventional 2D coverage analysis of an environment 120 by a sensor 211 based on a 2D floor plan. This includes an area 130 that is considered adequately covered, as well as an area that is occluded 129 due to a wall 121. However, coverage analyses based on just a 2D floor plan can leads to errors in coverage data due to objects that cannot be well represented accurately in the 2D floor plan, for example, a partial-height vertical wall 140, which can cause an error in the coverage analysis for an area 110 behind the partial-height wall.

FIG. 1B shows, for a side view, the coverage 'holes' that can be introduced when the 2D coverage analysis is based only on a 2D floor plan. Here, a vertical cross-section shows that the partial-height wall 140 introduces an area 110 that is not covered by the camera despite that the 2D analysis considers the area 110 covered, see FIG. 1A.

SUMMARY OF THE INVENTION

Brief Description of the Drawings

FIG. 4B is a schematic of projecting a field of view from a sensor through pixels to determine coverage data.

DETAILED DESCRIPTION OF THE PREFERRED EMBODIMENTS

System and Method Overview

Figure 1A:
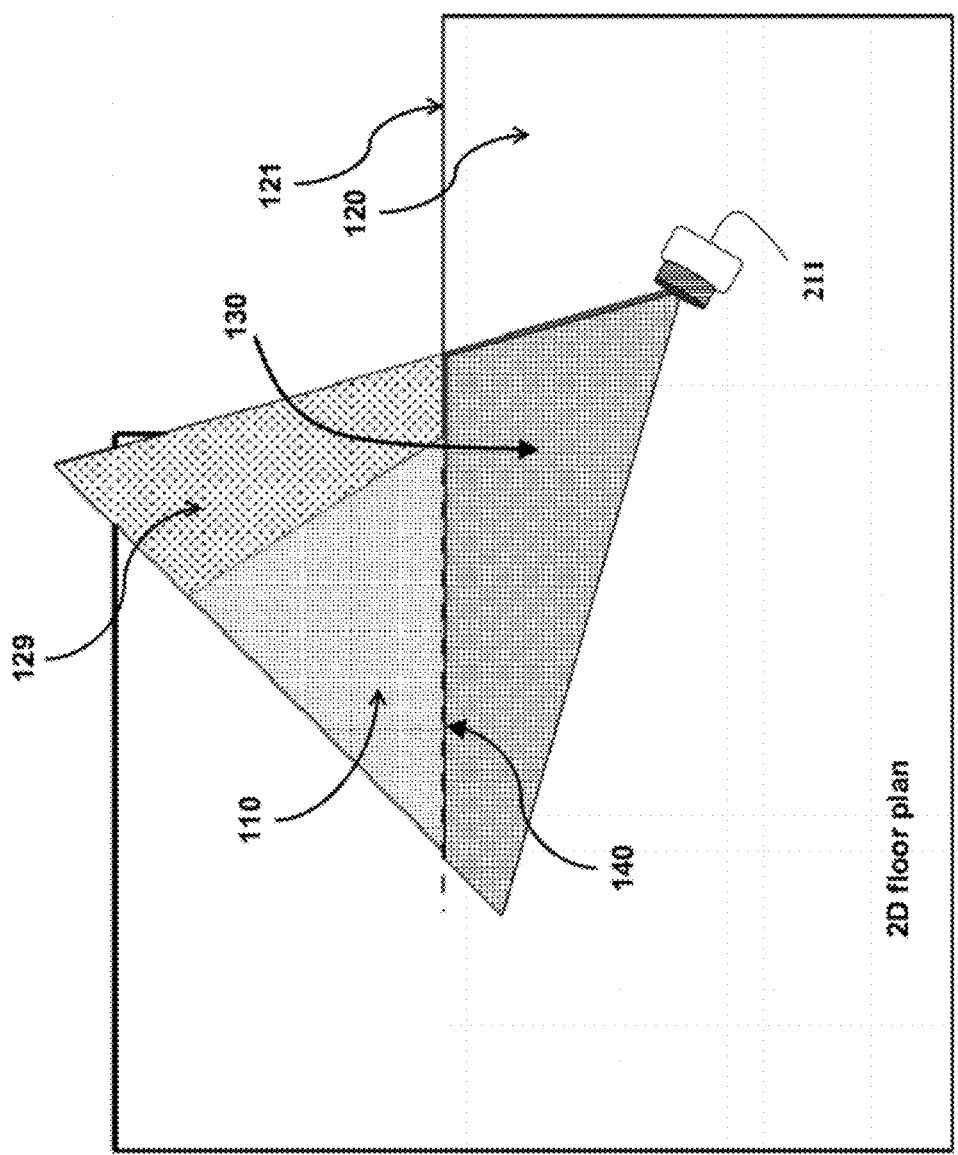
FIG. 1A is a top view schematic of conventional sensor coverage analysis using 2D a horizontal floor plan.
Figure 1B:
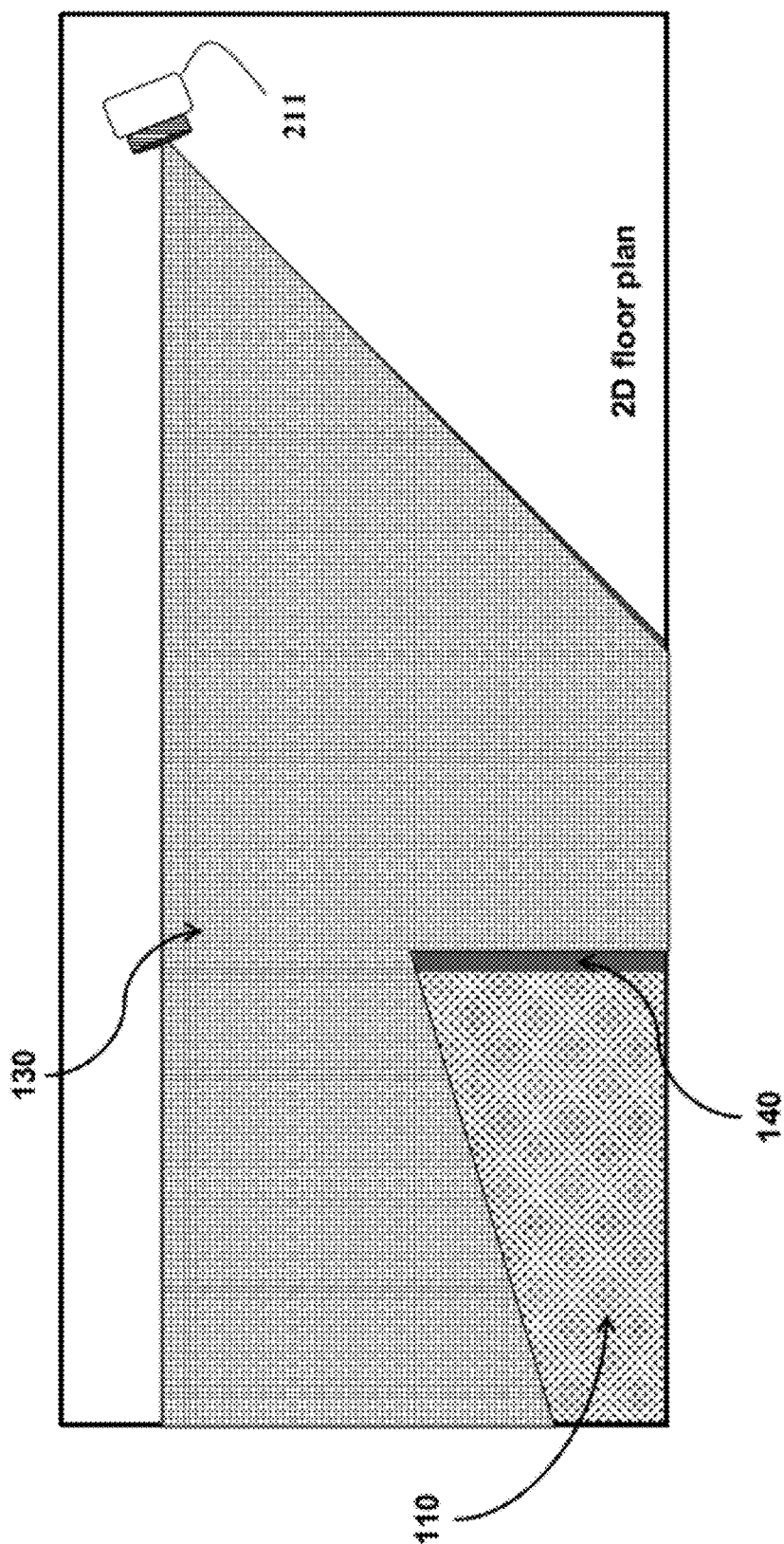
FIG. 1B is a side view schematic of the conventional sensor coverage shown in FIG. 1A.
Figure 2:
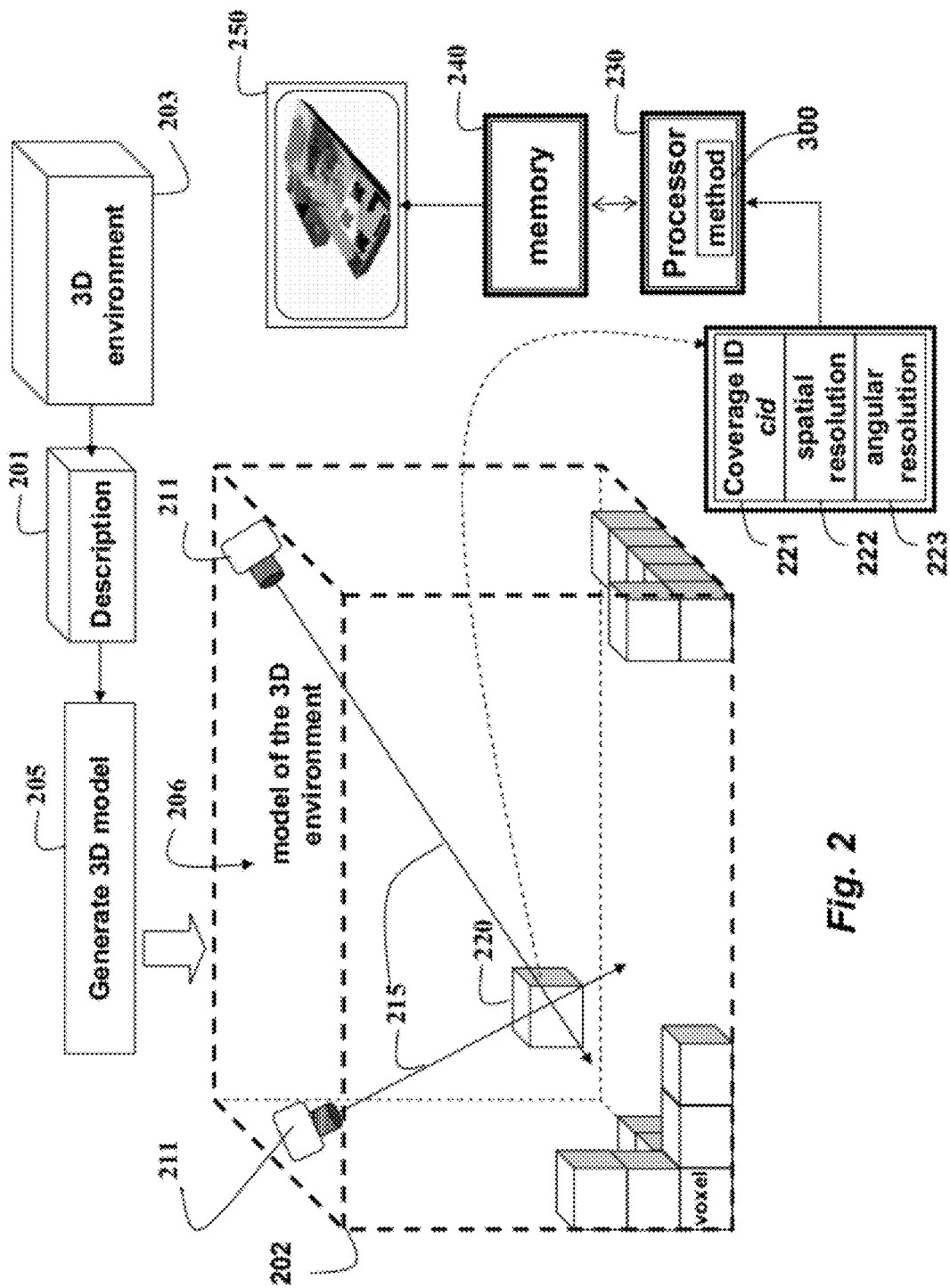
FIG. 2 is a block diagram of a system and method for analyzing and visualizing 3D coverage of a sensor arrangement according to embodiments of the invention.
Figure 3:
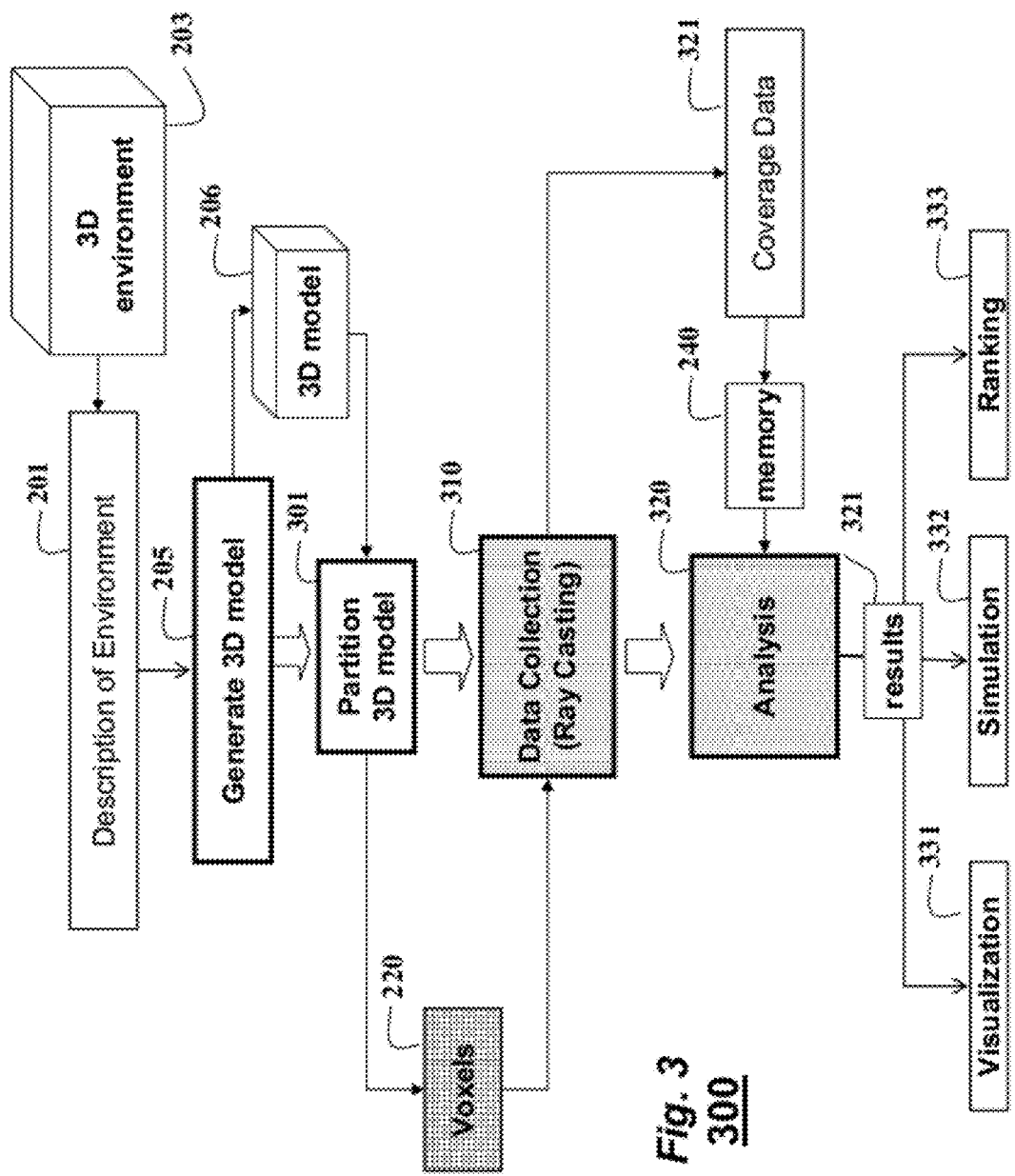
FIG. 3 is a flow diagram of a method for analyzing and visualizing 3D coverage of a sensor arrangement according to embodiments of the invention.

As shown in FIGS. 2 and 3, the embodiments of our invention provide a method 300 for analyzing 320 three-dimensional (3D) coverage of a 3D environment 203 by a set of sensors 211. The analysis is performed to assist in the design of an effective arrangement of sensors in the environment. The method steps 300 can be performed in a processor 230 connected to a memory 240, which can be further combined with input/output interfaces 250 as known in the art.

It should be understood that the environment 203 can be sensed by the set (one or more) of sensors selected from a wide-range of sensor types. The sensors can be any device that converts a physical signal to an electric signal using a field-of-view that can be modeled. The sensors can be video cameras, charge-coupled sensors, complementary metal-oxide-semiconductor (CMOS) sensors, lasers and ranging (LI-DAR) sensors, passive infrared (PIR) sensors, or ultrasound transducers.

A description 201 of the environment 203 is used to generate 205 a 3D model 206 of the environment. The description can be obtained from building design drawings, floor plans, and the like. The model can then be used repeatedly. Our method 300 also includes an initial partitioning 301 of the model 206 of the environment 203 into 3D voxels 220, generally polyhedrons, which completely tessellate the 3D model.

The method includes two primary phases: data collection 310; and data analysis 320. The results of the analysis can be, among others, visualized 331, simulated 332, or ranked 333 until an effective arrangement of the set of sensors is reached.

During the data collection phase 310, the method determines how effectively voxels can be sensed, or not. One way to do this is to casts rays 215 through the voxels 220 of the 3D model 206 of the environment 203 that has been partitioned 301 into the set of 3D voxels 220 to determine 3D coverage data 331 for the sensor arrangement, where coverage data refers to measure(s) of how effectively a 3D location within the environments is sensed by the set of sensors, or not.

After coverage data has been collected and stored into the memory 240, the data can be analyzed 320 by the method executing in the processor 230 to produce a result 321, which can then be used to assist in the design of the sensor arrangement by visualizing 331, performing simulations 332, or ranking 333 for various sensor arrangements. For example, a CCTV system in a secure environment can require stringent angular resolution to facilitate face detection, whereas a CCTV system in a convenience store can be more focused on wide coverage at a lower cost.

Data-Collection

Description of Environment

As shown in FIG. 2, the 3D description 201 of the environment 203 is provided. The model can be relatively coarse, e.g., indicating floors, ceilings (if any) walls, including partial-height walls, halls, and doorways. For an outdoor environment, buildings, bridges, and streets can be similarly modeled. Static infrastructure, such as filing cabinets, office equipment and furniture can also be modeled. The model is annotated with the arrangement of the sensors 211 sensing the environment. For each sensor, the data-collection phase determines the 3D locations that can be sensed by the set of sensors using the ray-casting. In one embodiment, the coverage data collected are identities of sensors 211 that can sense the 3D locations, a number of rays 215 cast through each voxel, and angles from which the voxel can be sensed by the sensors.

In the preferred embodiment, the description 201 includes 3D geometric data arranged, for example, into polygons for use with conventional rendering techniques as known in the art. However, the description can be any representation that can be used to determine intersections of the rays with the objects in the environment. This includes parametric descriptions of objects such as planes, spheres, boxes, tori, and curved surfaces, among many others.

Voxels

For each voxel 220, the coverage data 321 are stored individually in the memory. In our preferred embodiment, the model 206 is partitioned into ($2^P*2^Q*2^R$) uniformly sized voxels with no overlap or gaps between the voxels. That is, each voxel in the 3D model represents a unique portion of space in the environment. The voxels are arranged on a regular 3D grid. It is understood that other partitionings and representations are also possible.

The preferred partitioning is according to $$P = 2^{\lceil \log_2 \frac{X}{base} \rceil}, Q = 2^{\lceil \log_2 \frac{Y}{base} \rceil}, R = 2^{\lceil \log_2 \frac{Z}{base} \rceil}, \quad (1)$$

wherein base is a minimum size for the voxels, and X, Y, and Z are the respective dimensions of a bounding box 202 enclosing the model of the environment.

Ray Tracing

Figure 4A:
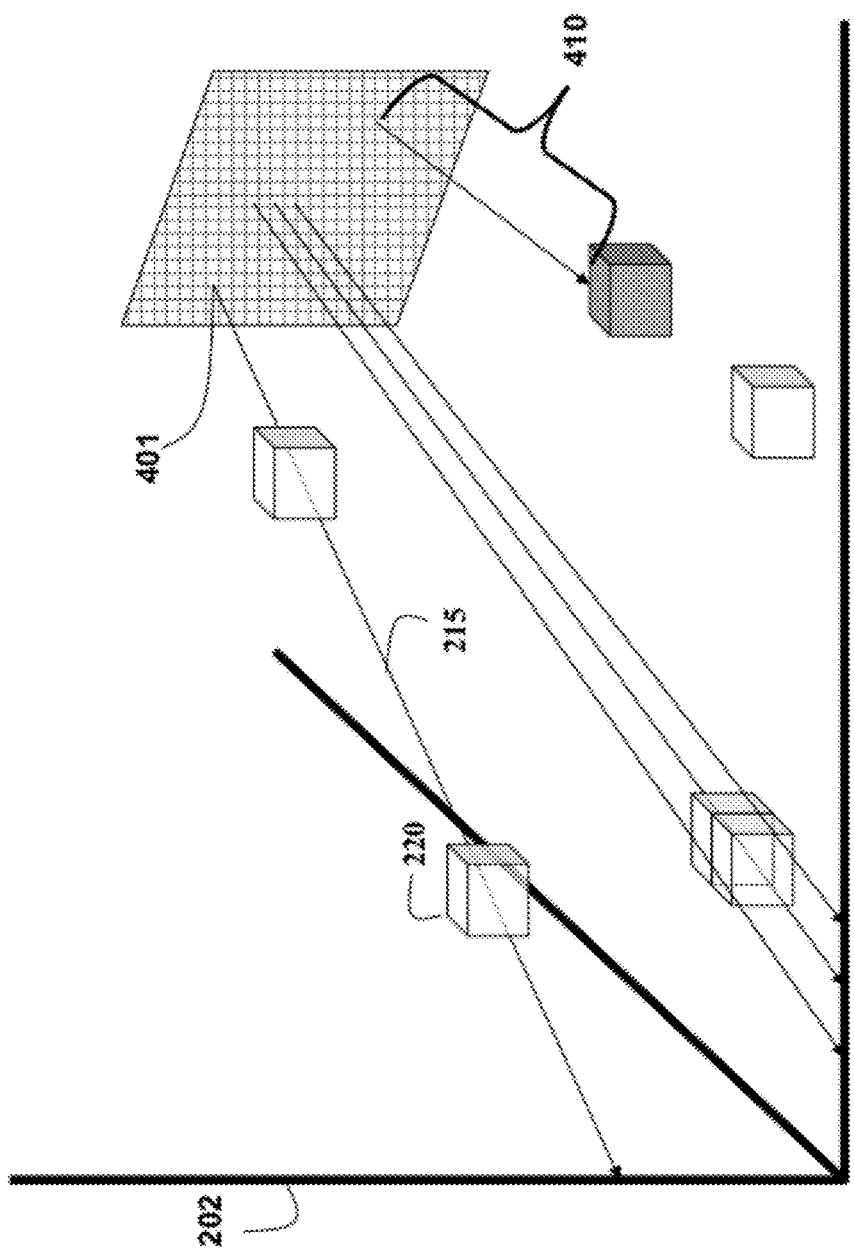
FIG. 4A is a schematic of rays cast from pixels through voxels.

As shown in FIG. 4A for one embodiment, the data-collection phase 310 generates a single ray 215 for every pixel 401 of every sensor. The pixels correspond to some partitioning of a plane that defines a field of view of the sensor. Rays can be accurately generated by calibrating the sensors and their geometries. The rays embody a projection of each sensor pixel through the environment. If the portion of the environment represented by a voxel is translucent (air), then the ray passes through the voxel and possibly intersects other voxels. If the portion is opaque, then the ray stops, as shown in FIG. 4, and the ray does not intersect voxels beyond the opaque voxel. although rays from other sensors can possible intersect occluded voxels. If a voxel has no intersecting rays, then the corresponding portion of the environment cannot be sensed, which is problematic and may require a rearrangement of the sensors.

The ray traverses the environment such that accurate coverage data can be determined for each voxel. Rays are often used in rendering techniques, such as photon-mapping, path-tracing, or ray-tracing. Therefore, data-collection can be integrated easily with conventional rendering pipelines in graphic processor units (GPUS).

For one embodiment, depths 410, which are distances from the sensor pixels to model geometry (voxels), are rendered into a depth buffer associated with each sensor. The distance value and coordinates of each pixel are used to determine the 3D locations of intersections between the corresponding ray and the model geometry, in a world coordinate system. The 3D location of intersection is the result of a multiplication of window coordinates of the pixel along with the distance by an inverse modeling matrix that converts the world coordinates to the windows coordinates. Each ray (vector) is represented by an origin, a direction, and a length.

To ensure each ray is only traversed when inside the model, the origin and length of the ray are reconciled with an intersection of the ray and the bounding box 202 of the model 206. Rays that do not intersect the bounding box are discarded.

Field of View Projection

Instead of casting a 2D ray (vector) through the 3D model as shown in FIG. 4A, another embodiment shown in FIG. 4B constructs and projects a geometric description of a field of view 450 for each sensing element such that objects 140 that intersect with or are contained in the field of view description are at least partially sensed by the element. If the sensor includes multiple sensing elements, the field of view of each sensing element is constructed, projected and tested for intersection with the voxels of the 3D model separately. For example, in a conventional CCTV camera with a CCD sensor, each pixel is considered a separate sensing element, and the field of view of each pixel 450, often represented geometrically by a pyramid, is tested separately for intersection with the voxels.

Construction of the field of view must also take into account the presence of objects 140 that can partially occlude the field of view. The geometric description of the field of view can be reconciled with occluded areas by subtracting a shadow volume 451 from the geometric description. Shadow volumes can be constructed from the point of view of each sensing element using conventional techniques known in the art.

After the geometric description of the field of view has been constructed, the voxels 220 within the bounding box 202 enclosing the 3D model can be systematically tested for intersection with the projected description of the field of view. It is understood that the voxels typically fill the entire volume of the bounding box, but for illustration purposes are only partially represented. For the purpose of data collection, the fields of view can be treated as though the views are rays cast from the sensor. As such, we describe data collection solely in terms of ray casting.

Traversing and Rasterizing Voxels

Procedures for traversing uniformly sized voxels are well known. Our traversing process is adapted to take advantage of single instruction, multiple data (SIMD) operations available on graphic processor units (GPU) and many streaming multiprocessors, such that each ray is processed by a separate execution thread.

The process of traversing a uniformly sized grid follows the method for rasterizing a line in 2D, such as in Besenham's line drawing algorithm. Many extensions of line drawing methods into 3D for ray-casting are known. Starting with the first voxel, the coverage data are determined for each voxel intersected by the ray.

Coverage Data

Coverage data include measurement(s) of how well each voxel is sensed by the arrangement of sensors. Here, the 3D coverage data associated with each voxel includes, an identification (id-coverage) for each sensor 221 that can sense the voxel, the number rays 222 that intersect the voxel (spatial resolution), and a range of angles 223 from which the voxel can be sensed by the sensors (angular resolution). Other coverage measurements can also be specified.

Spatial resolution refers to the number of rays that intersect the voxel, and therefore, the number of pixels that sense at least a portion of the voxel. The spatial resolution variable associated with each voxel can simply be incremented each time a ray intersects the voxel to determine the spatial resolution.

The Coverage ID is determined by setting, for each ray intersecting the voxel, the bit at a location cid in a variable representing coverage ID in the memory, where cid is the ID of the sensor from which the ray originated. Sensor IDs (cid) range from 0 to N−1, where N is the number of sensors. For instance, if only the sensors with cids equal to 3 and 5 can sense the voxel, the binary representation of the first eight bits of the variable representing id-coverage in the memory is 00101000.

To determine the angular resolution, we use a storage pattern wherein each bit of the variable in the memory represents a subset of angles from which a voxel can be sensed along a single axis of 3D space. For instance, using a 32-bit variable, each bit represents 11.25 degrees along a single axis. Variables using more bits can increase the resolution of the angular resolution measure. Three variables can be used to represent the x-, y-, and z-axes. Furthermore, because a ray intersecting a given voxel at an angle α can sense an object from a greater range than angle α alone. The range of bits representing the range α±β are predetermined.

The incidence angle α at which the ray enters the voxel can be determine according to the following equation:

$$\alpha = \frac{\arctan\left(\frac{r_y}{r_x}\right)}{\pi},$$

where $r_y$ and $r_x$ are the coordinates of the direction of the ray at eh point of intersection. The length and $r_x$ of the ray are normalized out.

Quantification, Visualization, and Simulation

After the coverage data 321 have been determined and stored in the memory, the data can be used in various ways to enable effective sensor arrangements. For instance, the coverage data from the voxels can be quantified to rank 333 an overall coverage measure for different sensor arrangements. The coverage data can also be used to visualize 331 a quality of coverage for each voxel, so areas that are under- or over-covered can be accounted for in future sensor arrangements. Simulations 332 of various arrangements can be performed to determine the effectiveness of the arrangement under certain real-world constraints.

Coverage Quantification

Our method converts the 3D coverage data into a format that can be easily integrated into computations of coverage quality. This involves converting a single aspect of coverage into a normalized range [0, 1] according to $$nc = \frac{c - \min}{\max - \min}, \quad (2)$$

where c is the coverage data value to be normalized, and nc is a normalized coverage.

Quantifying 3D coverage data stored in a bit-wise format is problematic. We take two general approaches. First, if we are interested in determining the voxels that can be sensed by one or more sensors, we begin by applying a bitwise AND (&) operation to the coverage data using a bit-mask representing a range of sensors of interest.

Then, we count the number of bits set and convert the data to our normalized range. If we are interested in simply determining the number of sensors that can sense a voxel, then we can use a bit-mask containing all 1s.

After we have quantified the coverage data, it is possible to rank various sensor arrangements by determining an effectiveness measure across all voxels. One very effectiveness measure is an average spatial resolution across all voxels in the environment, which can be very useful for ranking various sensor arrangements in a CCTV system for a public area.

Coverage Visualization

Visualization of coverage data acquired during data collection can help to design effective arrangements of sensors. The visualizing can be in 3D and can include intensity and color to represent various types of coverage, e.g., green full coverage, red no coverage, and orange for partial coverage. We provide three different methods of visualization, a raw visualization, a volumetric visualization, and a projective visualization.

Figure 5:
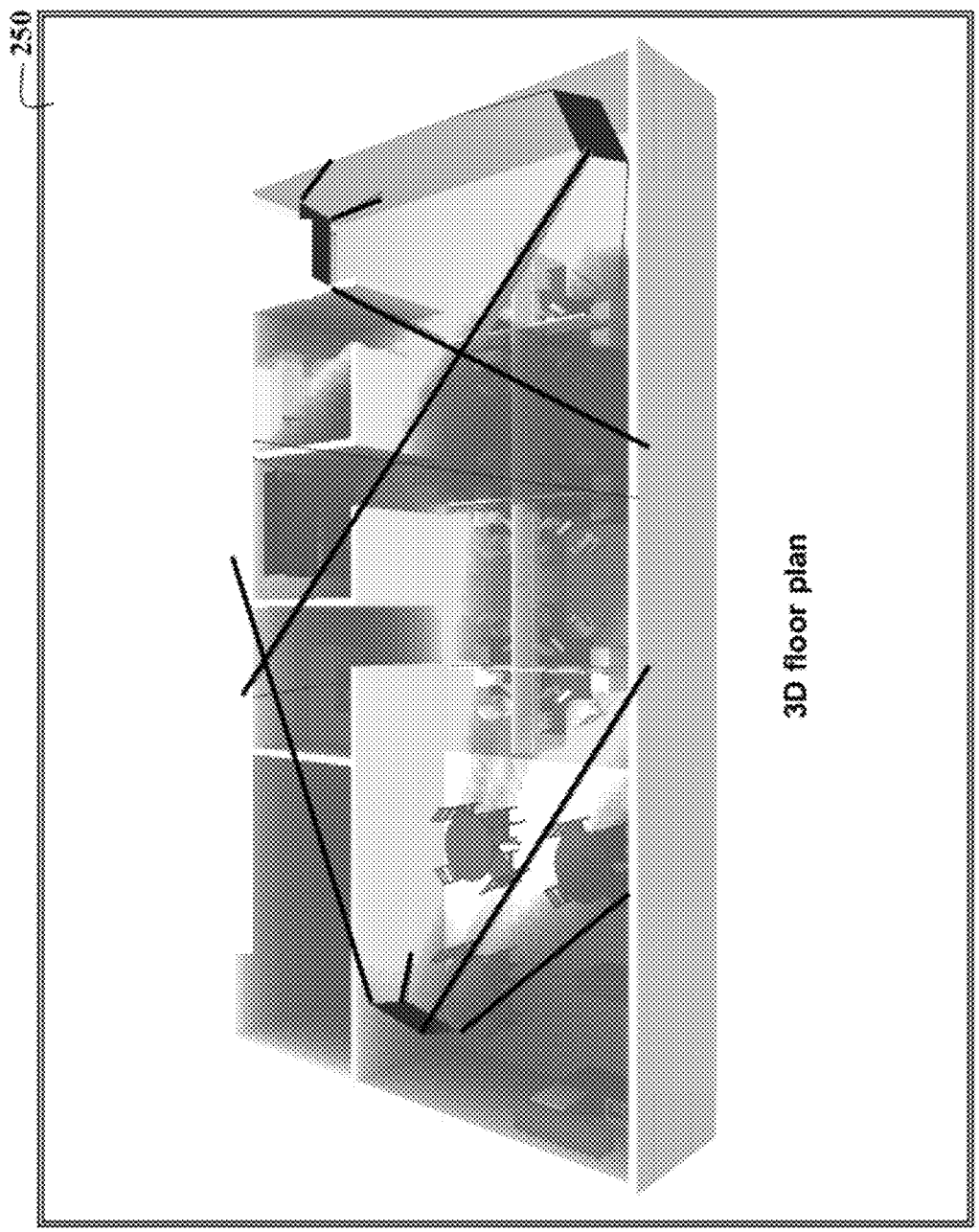
FIG. 5 is an example visualization of coverage according to embodiments of the invention

The raw visualization is the most straightforward and essentially involves coloring semi-transparent voxels in the model. The raw visualization is best used for quickly visualizing voxels that do not meet the min or max values used in the quantification of the coverage data. That is, quantified values greater or equal to 1.0 or less than or equal to 0.0. This can be used to quickly find 'holes' in the coverage that require adjustment of the sensor arrangement. For example, in FIG. 5, portions not covered or partially covered are darker than covered portions.

The volumetric visualization of the 3D coverage data extends the raw visualization method in four ways:

(1) showing areas that are between min and max from (2), i.e., 0<nc<1;
(2) the 3D coverage data can be downsampled by powers of two to allow for visualization at multiple scales;
(3) because multiple voxels are combined by the downsampling, various operations can be used to selectively view the data in different ways, e.g., average, maximum, minimum, median, etc.; and
(4) visualization of the 3D coverage data need not focus on a single aspect of coverage, but can be combined in intelligent ways.

The ability to downsample the 3D coverage data by powers of two is similar to the concept of mipmapping a 3D texture, and the same procedure can be used for determining averages. Mipmapping reduces the resolution of a 3D texture by successively averaging 2×2×2 elements into a single element; thus, a 256×256×256 3D texture is mipmapped by a single level to 128×128×128. However, because we are interested in applying operations other than taking an average, such as taking the maximum, we modify the mipmapping of 3D coverage data to directly return four floating point numbers corresponding to color values, e.g., red, green, blue and translucency (RGBA). The color values control the rendering of individual (scaled) voxels. The remaining two extensions of the raw visualization mode control the combination of data internal and external to a single voxel to determine the values.

A projective visualization traces the rays from pixels in a virtual sensor observing the description of the environment and sensor arrangement through the environment to the 3D location of intersection. As a ray traverses the environment, statistics about the coverage data from the traversed voxels can be combined using operations such as those described above. These statistics can then be used to generate an 'overlay' that can be combined with the color values acquired from rendering the model to signify the level of coverage from a line-of-sight.

Coverage Simulation

The coverage data stored associated with each voxel of the model can be combined with various mechanisms and scenarios that can exist within the environment to determine the effectiveness of an arrangement of sensors. For instance, many studies of traffic-patterns have been performed to determine the usual flow of the traffic at any period in a day. Using this traffic flow data, the model of the environment can be simulated so that objects, e.g., humans or vehicles, traverse the model as can be expected in real-world situations. Then, images from the modeled sensors can be rendered and forwarded to various security mechanisms to determine effective parameters for quantifying coverage data. One example simulation is to use a face detection to determine acceptable angular resolution parameters to ensure that all faces that pass through secure areas are processed correctly.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for analyzing coverage of a three-dimensional environment by a set of sensors, comprising the steps of:
   partitioning a 3D model of the environment into a set of voxels, wherein each voxel represents a portion of the environment; and
   casting a ray from each pixel in each sensor through the set of voxels of the 3D model to determine locations in the environment that can be sensed by the set of sensors to produce coverage data for each voxel, wherein the coverage data includes an identity of each sensor, a number of rays cast through each voxel, and angles from which each voxel can be sensed by the set of sensors; and
   analyzing the coverage data to determine a result indicative of an effective arrangement of the set of sensors, and wherein description of the environment, the voxels and the coverage data are three dimensional, and the steps are performed in a processor.

2. The method of claim 1, the set of sensors includes cameras, charge-coupled sensors, complementary metal-oxide-semiconductor sensors, lasers sensors, ranging sensors, passive infrared sensors, or ultrasound transducers.

3. The method of claim 1, further comprising:
   visualizing the result.

4. The method of claim 1, further comprising:
   simulating the result.

5. The method of claim 1, further comprising:
   ranking the result.

6. The method of claim 1, wherein the environment is indoors, and the description of the environment indicates floors, ceilings, walls, halls, doorways, and static objects.

7. The method of claim 1, wherein the environment is outdoors, and the description of the environment includes buildings, bridges, and streets.

8. The method of claim 1, wherein the voxels are uniformly sized voxels and arranged in a regular 3D grid.

9. The method of claim 1, wherein the partitioning is according to $$P = 2^{\lceil log_2 \frac{X}{base} \rceil}, Q = 2^{\lceil log_2 \frac{Y}{base} \rceil}, R = 2^{\lceil log_2 \frac{Z}{base} \rceil},$$

wherein base is a minimum size for the voxels, and X, Y, and Z are respective dimensions of a bounding box a model of the environment.

10. The method of claim 1, further comprising:
   rendering a distance into a depth buffer associated with each sensor to 3D determine locations of intersections between the corresponding ray and the set of voxels, wherein the distance is from each pixel in each sensor along each ray to a point of intersection with the 3D model.

11. The method of claim 1, wherein the description of the environment uses world coordinates, and the set of pixels uses window coordinates, and further comprising:
   multiplying window coordinates of the pixel along with the distances by an inverse modeling matrix that converts the world coordinates to the windows coordinates.

12. The method of claim 1, wherein each ray has an origin, a direction, and a length.

13. The method of claim 3, wherein properties of the visualization comprise any of the following, color, intensity, translucency, or voxel size, or combinations thereof.

14. The method of claim 1, further comprising:
   normalizing the coverage data.

15. The method of claim 3, wherein the visualizing is a raw visualization.

16. The method of claim 3, wherein the visualizing is a volumetric visualization.

17. The method of claim 3, wherein the visualizing is a projective visualization.

18. The method of claim 3, further comprising:
   downsampling the coverage data before the visualizing.

19. A method for analyzing coverage of a three-dimensional environment by a set of sensors, comprising the steps of:
   partitioning a 3D model of the environment into a set of voxels, wherein each voxel represents a portion of the environment, wherein the partitioning is according to $$P = 2^{\lceil log_2 \frac{X}{base} \rceil}, Q = 2^{\lceil log_2 \frac{Y}{base} \rceil}, R = 2^{\lceil log_2 \frac{Z}{base} \rceil},$$

wherein base is a minimum size for the voxels, and X, Y, and Z are respective dimensions of a bounding box a model of the environment; and
   constructing a description of the field of view for each sensor; and
   projecting the descriptions of the field of view through the set of voxels to determine 3D coverage data; and
   analyzing the coverage data to determine a result indicative of an effective arrangement of the set of sensors, and wherein description of the environment, the description of the field of view, the voxels and the coverage data are three dimensional, and the steps are performed in a processor.

20. The method of claim 19, wherein the constructing accounts for occlusions by subtracting shadow volumes from the description of the field of view.

* * * * *